(12) United States Patent
Tapia et al.

(10) Patent No.: US 9,445,452 B2
(45) Date of Patent: Sep. 13, 2016

(54) DIRECTED APPLICATION CONTROL OF USER DEVICE RADIO

(71) Applicant: T-Mobile USA, Inc., Bellevue, WA (US)

(72) Inventors: Pablo Tapia, Snoqualmie, WA (US); Kevin Lau, Issaquah, WA (US)

(73) Assignee: T-Mobile U.S.A. Inc., Bellevue, WA (US)

(*) Notice: Subject to any disclaimer, the term of this patent is extended or adjusted under 35 U.S.C. 154(b) by 153 days.

(21) Appl. No.: 14/561,848

(22) Filed: Dec. 5, 2014

(65) Prior Publication Data

US 2016/0165657 A1 Jun. 9, 2016

(51) Int. Cl.
*H04W 4/00* (2009.01)
*H04W 76/04* (2009.01)
*H04L 29/06* (2006.01)
*H04W 52/28* (2009.01)

(52) U.S. Cl.
CPC .......... *H04W 76/046* (2013.01); *H04L 65/601* (2013.01); *H04W 52/287* (2013.01)

(58) Field of Classification Search
CPC ............ H04W 76/046; H04W 52/287; H04L 65/601
See application file for complete search history.

(56) References Cited

U.S. PATENT DOCUMENTS

| 6,473,419 | B1 | 10/2002 | Gray et al. |
| 2003/0045293 | A1 | 3/2003 | Lee et al. |
| 2006/0209176 | A1* | 9/2006 | Nakamura ............. G08B 25/10 348/14.01 |
| 2006/0242328 | A1 | 10/2006 | Guo et al. |
| 2007/0153729 | A1* | 7/2007 | Alapuranen ............. H04B 7/12 370/329 |

FOREIGN PATENT DOCUMENTS

KR 20100047065 A 5/2010

OTHER PUBLICATIONS

"International Search Report and Written Opinion" for PCT/US2015/063035, mailed Feb. 29, 2016, 9 pages.
Jacques Bou Abdo et al. "Application-Aware Fast Dormancy in LTE," 2014 IEEE 28th International Conference on Advanced Information Networking and Applications, pp. 194-201, May 13-16, 2014. See section IV.

* cited by examiner

*Primary Examiner* — Afshawn Towfighi
(74) *Attorney, Agent, or Firm* — Han Santos Reich, PLLC (57) ABSTRACT

Techniques described herein provide coupling an application to a radio of a user device to, for example, optimize media streaming services. Implementations include receiving, by a user device, first data of a file and second data of the file. The user device may present the first data of the file using an application implemented by the user device. In response to a determination that an amount of data in the second data is greater than a predetermined threshold, the user device may invoke a command associated with a radio of the user device by calling a radio API to place the radio into a dormant state. The radio API may be configured to couple the application to the radio.

20 Claims, 5 Drawing Sheets

DIRECTED APPLICATION CONTROL OF USER DEVICE RADIO

BACKGROUND

Today's mobile devices are often equipped with processors that may perform many tasks, such as running various applications, recording data, playing media, and performing other tasks for a user. Mobile devices include telecommunication devices, Wi-Fi devices, and other devices having connectivity to a network. Although these devices have powerful processing capabilities, they often have limited onboard resources, such as limited energy sources in the form of batteries. With the increasing data usage, the operation time of a mobile device is significantly affected by how effective the mobile device handles its power consumption.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

In telecommunications, networks typically wait for a predefined amount of time before transiting a user device from a higher energy state to a lower energy consumption state. This may be performed to avoid increased signaling due to unnecessary transitions between the states and to avoid increased delays, which may result in a negative user experience. However, such an approach has a negative impact on battery performance of the user device. To address this problem, the user device may adopt fast dominancy, a feature intended to enhance the battery performance of the user device.

Under conventional techniques, entering fast dormancy on a user device does not rely on information associated with an application, such as a media application implemented by the user device. The information may include, for example, whether the application has actually finished transmitting or receiving data, or whether the application is paused and will continue transmitting or receiving data. Examples herein describe a user device that has an internal connection between an application and a radio, such that the application may cause the radio to enter a dormant state in response to a determination that the application has neither transmitted nor received data for a predetermined time, which may be determined by the application or another component associated with the user device.

Illustrative Environment

Figure 1:
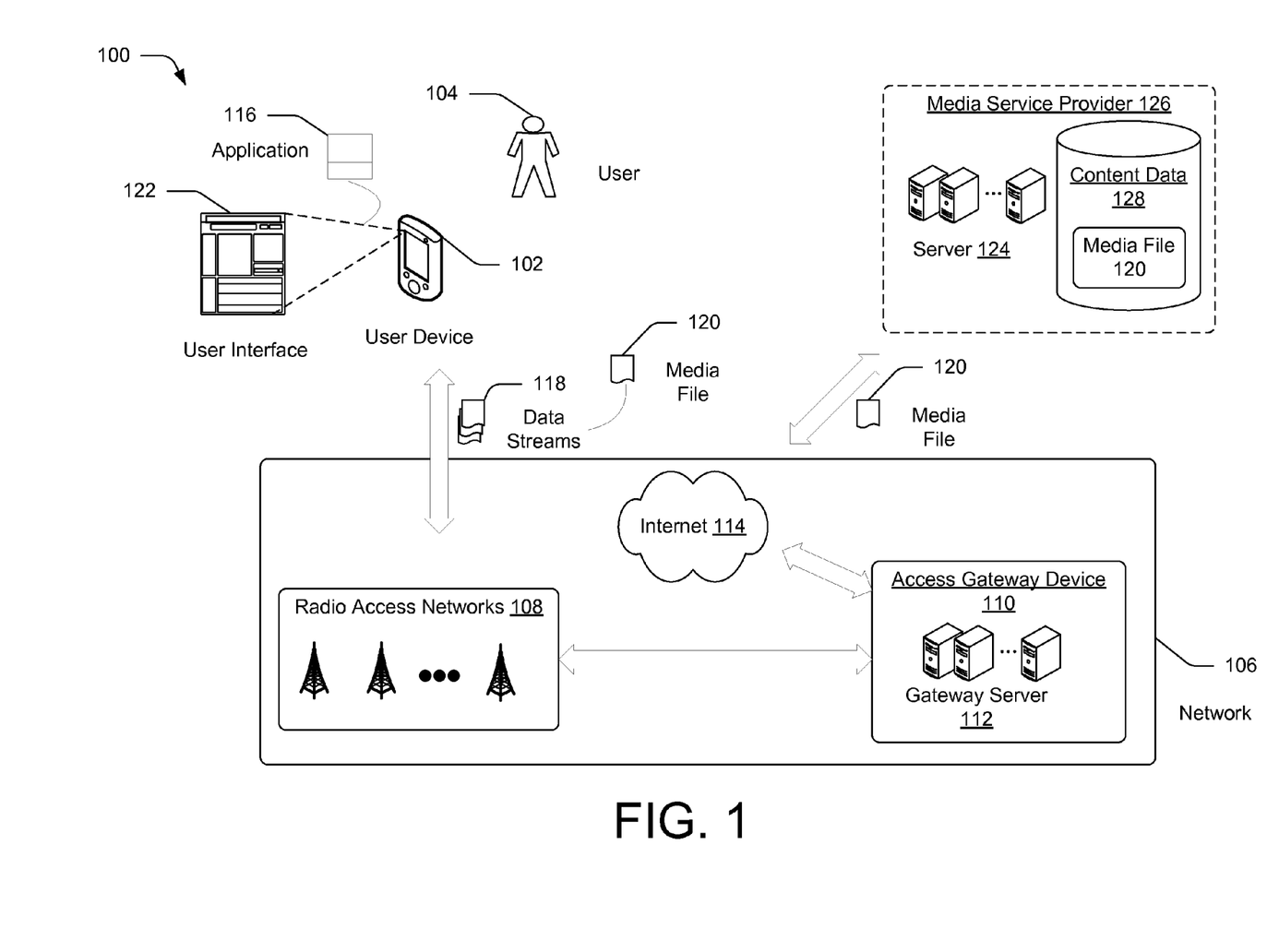
FIG. 1 is a diagram of an illustrative telecommunication environment that enables optimization of streaming media services.

FIG. 1 is a diagram of an illustrative environment 100 that enables optimization of streaming media services. The environment 100 includes a user device 102 associated with a user 104. The articles "a" and "an" are used herein to refer to one or to more than one (i.e. to at least one) of the grammatical object of the article. By way of example, "a user" means one user or more than one users. The user device 102 includes any type of device having a component for communicating with one or more other devices via one or more communication channels including, for example, wireless communication channels, such as infra-red, RF, optical, terrestrial, satellite communication media, and wired communication channels, such as copper wires, coaxial cables, Fiber-optic cables. Examples of the user device 102 may include mobile telephones/smartphones, netbooks, tablet computers, personal computers, data sticks, network adapters, and other electronic devices that may exchange signals, such as radio signals.

The user device 102 may exchange data with other computing devices through a network 106. The network 106 may include a plurality of hardware, software, and other infrastructure. The environment 100 shows an illustrative arrangement of the network 106; however, other arrangements may be used to facilitate transmission of data between the user device 102 and other computing devices.

The network 106 may include various configurations of telecommunications networks that include radio access networks (RANs) 108 used for mobile communications. The telecommunications networks may include an access gateway device 110 and may include a number of different types of components, which may be provided by various companies. In some instances, the telecommunications networks may conform to Universal Mobile Telecommunications System (UMTS) technologies that employ UMTS Terrestrial Radio Access Network (UTRAN). In some instances, the UTRAN may share a several components like a Circuit Switch (CS) and a Packet Switch (PS) core network with a GSM EDGE Radio Access Network (GERAN) (Global System for Mobile Communications (GSM), Enhanced Data rates for GSM Evolution (EDGE)). In various instances, long term evolution (LTE) networks may be employed to transmit data for the telecommunications networks besides UMTS. Thus, UTRAN and GERAN networks (and other possible RANs) may coexist to process telecommunications traffic. In some instances, communications may be handed off between UTRAN and GERAN networks (or other networks) and still maintain a communication with a common core network, such as when the user device 102 leaves a range of access (zone) of a UTRAN and enters a range of access of a GERAN. Handoffs may further occur between different types of hardware, such as different manufacturers, versions, for a same network type, such as UTRAN, GERAN. In addition, other types of networks, RANs, and/or components (hardware and/or software) may be employed which enable the user device 102 to communicate with the core network to facilitate activities such as voice calling, messaging, emailing, accessing the Internet, or other types of data communications. For example, the network 106 is, at least in part, a Wi-Fi based network, a Bluetooth network, or other type of wireless network. The access gateway device 110 may include a gateway server 112 that perform some or all of the functions of the access gateway device 110.

In accordance with various implementations, the access gateway device 110 may be in communication with the Internet 114, which may include Internet servers. The access gateway device 110 and the Internet 114 may be in communication with the RANs 108. The user device 102 may upload data to the RANs 108 via an uplink communication and may download data from the RANs 108 via a downlink communication. In some implementations, the user device 102 may be in communication with the internet 114 via a wired connection.

During an interaction the user 104 may conduct media streaming such as video streaming by implementing an application 116. In some implementations, the user device may receive data streams 118 associated with a media file 120, and implement the application 116 to present the data streams 118 in a user interface 122. For example, the user device 102 may receive and discriminate between the data streams 118 in forms of radio data streams on a single radio frequency (RF) channel or on multiple RF channels. The application 116 may present the received data streams 118 to the user 104 in the user interface 122. In some implementations, the application 116 may directly control a radio component of the user device 102 such as to optimize media streaming services.

In some implementations, an individual data stream of the data streams 118 may contain data of at least a portion of the media file 120. The data includes, for example, video recordings, audio recordings, multimedia presentations, slide presentations, and/or online content. The media file 120 may include a video file, an audio file, a multimedia file, and/or a text file. For example, the media file 120 may include multiple frames of video content, and an individual frame of the multiple frames may represent an instance of the video content, for example, a picture.

In some implementations, the media file 120 may be maintained by a server 124 associated with a service provider 126. The service provider 124 may provide media services including media streaming of the content data 128, such as the media file 120, access to the Internet, and/or access to other services, such as value-added services. The content data 128 may include an electronic medium including video recordings, audio recordings, multimedia presentations, slide presentations, CD-ROM, and/or online content. The content data 128 is in either analog electronic data or digital electronic data format.

Illustrative Architectures

Figure 2:
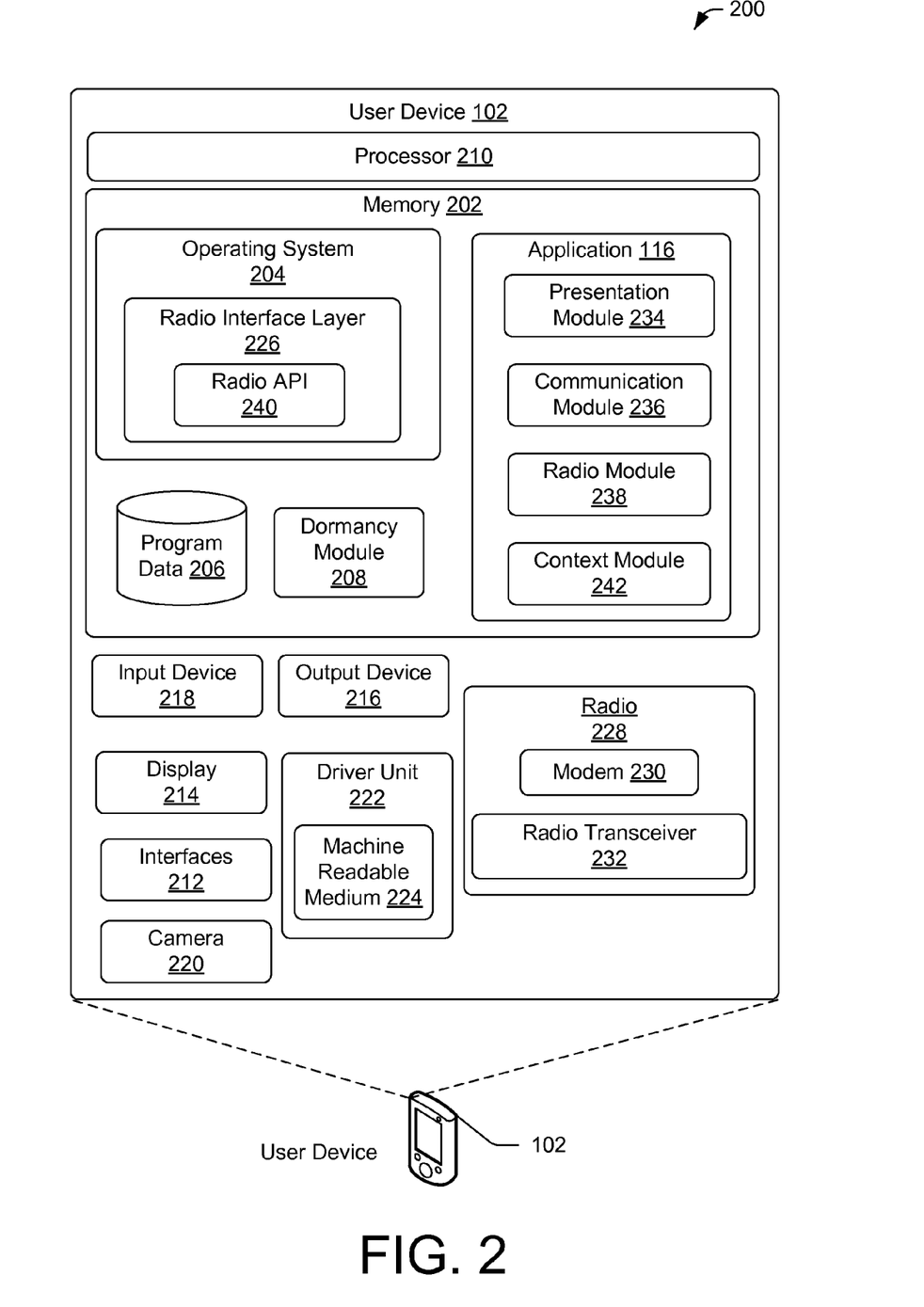
FIG. 2 is a schematic diagram of an illustrative computing architecture that provides coupling an application to a radio of a user device.

FIG. 2 is a schematic diagram of an illustrative computing architecture 200 that provides coupling an application and a radio. The computing architecture 200 shows additional details of at least one portion of the user device 102, which may include additional modules, kernels, data, and/or hardware.

In some implementations, the user device 102 may include a memory 202, the memory storing an operating system (OS) 204, the application 116, program data 206, and/or other component, such as a dormancy module 208. The user device 102 may further include a processor 210, interfaces 212, a display 214, output devices 216, input devices 218, a camera 220, and drive unit 222, which may include a machine readable medium 224. The user device 102 may further include a radio interface layer (RIL) 226 and a radio 228. The radio 128 may include a modem 230, and a radio 232. In some implementations, the processor 210 is a central processing unit (CPU), a graphics processing unit (GPU), or both CPU and GPU, or other processing unit or component known in the art.

In various implementations, memory 202 generally includes both volatile memory and non-volatile memory. Such as RAM, ROM, EEPROM, Flash Memory, miniature hard drive, memory card, CD-ROM, digital versatile disks (DVD) or other optical storage, magnetic cassettes, magnetic tape, magnetic disk storage or other magnetic storage devices, or any other medium. Additionally, in some implementations, memory 202 includes a SIM (subscriber identity module) card, which is a removable memory card used to identify a user of the user device 102 to a service provider network.

Memory 202 may further be described as computer storage media. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, program data, or other data. The system memory, the removable storage and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other medium that may be used to store the desired information and which may be accessed by the user device 102. Any such computer storage media may be part of the user device 102. Moreover, the computer-readable media may include computer-executable instructions that, when executed by the processor(s), perform various functions and/or operations described herein.

In contrast, communication media may embody computer-readable instructions, data structures, program modules, or other data in a modulated data signal, such as a carrier wave, or other mechanism. As defined herein, computer storage media does not include communication media.

In various implementations, the interfaces 212 may include various types of interfaces. For example, the interfaces 212 include any one or more of an Ethernet interface, wireless local area network (LAN) interface, a near field interface, a DECT chipset, or an interface for an RJ-11 or RJ-42 port. The a wireless LAN interface may include a Wi-Fi interface or a Wi-Max interface, or a Bluetooth interface that performs the function of transmitting and receiving wireless communications using, for example, the IEEE 802.11, 802.16 and/or 802.20 standards. For instance, the user device 102 may use a Wi-Fi interface to communicate directly with a nearby device. The near field interface may include a Bluetooth® interface or radio frequency identifier (RFID) for transmitting and receiving near field radio communications via a near field antenna. For example, the near field interface may be used for functions, as is known in the art, such as communicating directly with nearby devices that are further, for instance, Bluetooth® or RFID enabled. A reader/interrogator may be incorporated into user device 102.

In various implementations, the display 214 is a liquid crystal display or any other type of display commonly used in telecommunication devices. For example, display 214 may be a touch-sensitive display screen, and may then further act as an input device or keypad, such as for providing a soft-key keyboard, navigation buttons, or the like.

In some implementations, the output devices 216 include any type of output devices, such as a display (already described as display 214), speakers, a vibrating mechanism, or a tactile feedback mechanism. The output devices 218 further include ports for one or more peripheral devices, such as headphones, peripheral speakers, or a peripheral display.

In various implementations, the input devices 218 include any type of input devices. For example, the input devices 218 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may further include a joystick-like controller and/or designated navigation buttons, or the like.

The machine readable medium 224 stores one or more sets of instructions, such as software, embodying any one or more of the methodologies or functions described herein. The instructions may further reside, completely or at least partially, within the memory 202 and within the processor 210 during execution thereof by the user device 102. Portions of the memory 202, as accessed by the processor 210, may further constitute machine readable media 224.

The RIL 226 may include an interface layer for mobile operations and connections between mobile operation system and radio hardware. In some implementations, the RIL 226 may include an application programming interface (API) set that provides a level of abstraction between a radio and an application of the user device 102. In some implementations, the RIL 226 may reside in the OS 204 and/or is a layer that provides an interface to the radio 228. For example, the RIL 226 may provide an interface to the modem 230 and/or a radio transceiver 232 of the user device 102. The modem 230 may receive data from the application 116, and produce a signal or signals that may be transmitted by the radio transceiver 232 over the network 106. The modem 230 may be aware of an uplink scheduling ability and other network metrics associated with the network 106. The modem 230 may have a buffer by which the modem 230 may store data prior to the data being transmitted through the network 106 via the radio transceiver 232.

The radio transceiver 232 may include a radio transceiver and an interface that performs the function of transmitting and/or receiving radio frequency communications via an antenna of the user device 102. The radio interface facilitates wireless connectivity between the user device 102 and various cell towers, base stations and/or access points that are associated with the RANs 108.

In some implementations, the application 116 may include various component, such as a presentation module 234, a communication module 236, a radio module 238, and/or a context module 242. The communication module 236 may be configured to receive first and second data of a file, such as the media file 120. For example, the communication module 236 may receive a first data stream segment of the media file 120, such as a video file, and a second data stream segment of the media file 120, such as a subsequent data stream segment of the video file.

The presentation module 234 may be configured to present the first and/or second data of the media file 120 to the user 104. For example, the application 116 may present one or more data streams of the data streams 118 to the user 104 in the user interface 122 on the user device 102.

The radio module 238 may be configured to invoke a command associated with the radio 228 of the user device 102. In some implementations, the radio module 238 may call a radio API 240 to place the radio 228 into a dormant state in response to one or more determinations. In some instances, a determination may be associated with an amount of data received by the application 116. For example, the amount of the second data received by the application 116 is greater than a predetermined threshold. For example, an amount of the first data and the second date received by the application 116 is greater than a predetermined threshold. In some instances, a determination may be associated with status of data transmission performed by the application 116. For example, the application 116 stops requesting the additional data of the file in the predetermined time period. In some instances, the radio API 240 may be exposed/implemented by the RIL 226 to couple the application 116 and the radio 228.

In some implementations, to conserve the battery power of the user device 102, the user device 102 may be transited from a connected state to a dormant state when no further data transfer is anticipated. For example, the user device 102 may place the radio 228 into the dormant state such that radio 228 does not communicate, such as transmitting/receiving data, with the RANs 108. In other examples, while the radio 228 may still communicate with the RANs 108 in the dormant state, the data connection speed in the dormant state is reduced as compared to the one in the connected state.

In some implementations, the radio module 238 may cause the user device to enter a dormant state such that user device 102 may reduce power consumption of the user device 102. For example, the dormancy module 208 may be configured to apply fast dormancy to place the user device 102 into a radio resource control (RRC) state. In some implementations, the fast dormancy may be implemented by sending a radio release signal from the user device 102 to the RANs 108. The RANs 108 may then trigger a RRC state transition of the user device 102 from a first state to a second state. The second state is more battery efficient than the first state. For example, the first state may include various RRC states, such as a Cell_DCH state, a Cell_FACH state, a Cell_PCH state, or a URA_PCH state. The second state may include various RRC states, such as a Cell_FACH state, a Cell_PCH state, or a URA_PCH state in 3G, or an idle mode in 4G/LTE.

In some implementations, the context module 242 may be configured to determine context associated with the wireless communication that the user device 102 is engaged. Based on the determined context, the application 116 may determine whether to invoke the command associated with the radio 228 to place the user device 102 into a dormant state. The determined context may indicate whether the application 116 expects data transmission for a predetermined time period.

For example, the context module 242 may determine that the user 104 has sent out an email and is working on another email using the application 116. The application 116 may place the user device 102 into the dormant state for a predetermined time period via the radio 228 since the application 116 may not request data transmission in the predetermined time period in light of the context.

In some implementations, the context module 242 may obtain information of user behavior/habits associated with the user 104 with respect to multiple wireless communications associated with the user device 102. For example, the user behavior/habits may be tracked for the application 116 or another application implemented by the user device 102. In these instances, based on the determined context and the information of user behavior/habits, the application 116 may determine whether to invoke the command associated with the radio 228 to place the user device 102 into a dormant state.

In some implementations, the context module 242 may determine that the user is visiting a website using the application 116 and then determine a website parameter of the website, such as a uniform resource locator (URL) of the website and/or a website design. The website parameter may indicate whether the user 104 stays on a webpage of the website for a certain time period. For example, the website design may include a summary and a link in a webpage of the website, wherein the link leads to a story of the summary in another webpage of the website. In these instances, based on the website parameter and a user action, the application 116 may determine whether to place the user device 102 into the dormant state for a predetermined time period via the radio 228.

In some implementations, a software development kit (SDK) associated with the radio API may be provided by the user device 102, the access gateway device 110, and/or third-party service providers. In these instances, the SDK may provide a plurality of application programming interfaces (APIs) or developer tools related to optimization of streaming media services.

Figure 3:
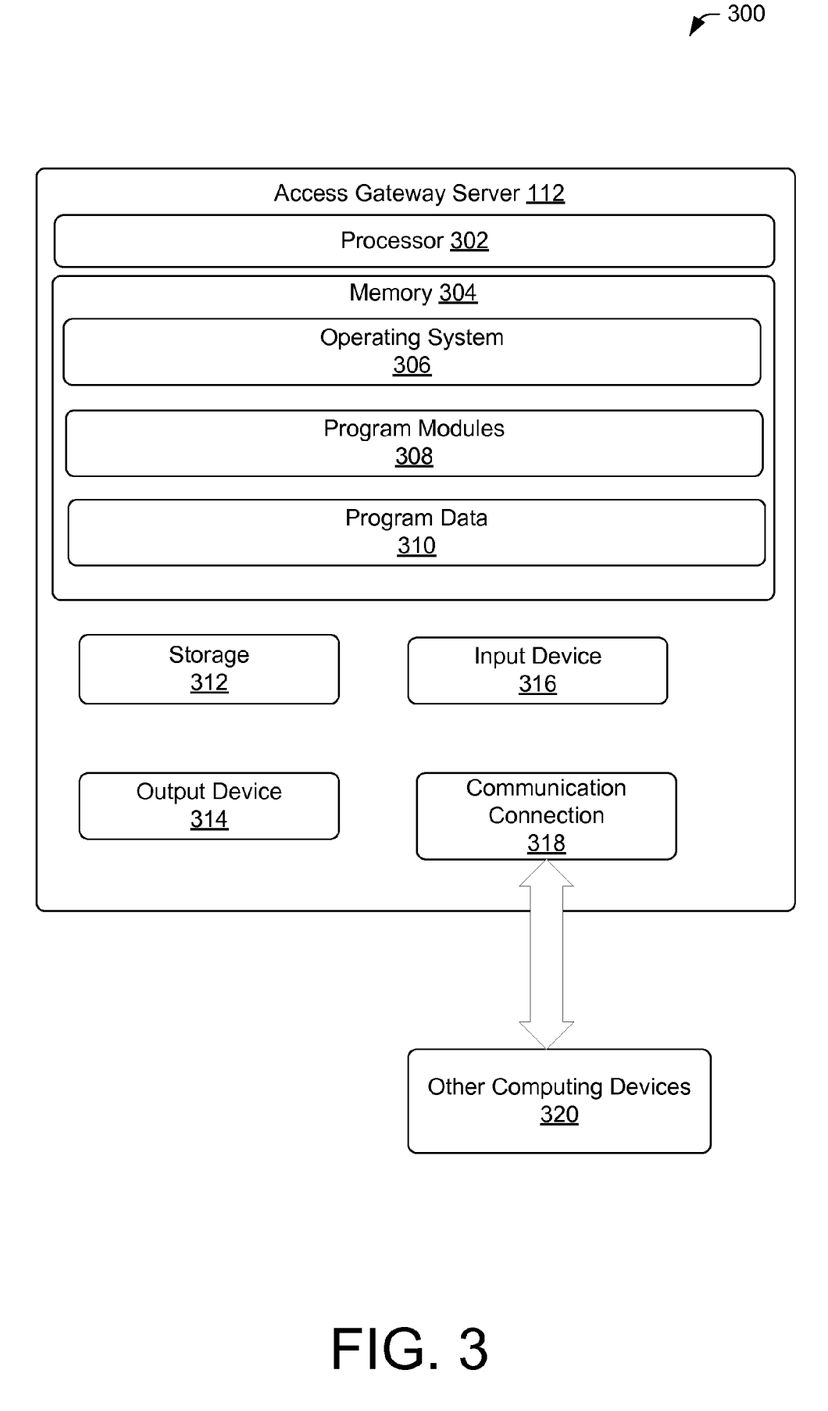
FIG. 3 is a schematic diagram of an illustrative computing architecture that facilitates optimization of streaming media services.

FIG. 3 is a schematic diagram of an illustrative computing architecture 300 that facilitates optimization of streaming media services. The computing architecture 300 shows additional details of at least one portion of the gateway server 112, which may include additional modules, kernels, data, and/or hardware.

In various implementations, the gateway server 112 may include at least one processing unit 302 and system memory 304. Depending on the exact configuration and type of computing device, system memory 304 may be volatile, such as RAM, non-volatile, such as ROM, flash memory, or some combination of the two. The system memory 304 may store an operating system 306, one or more program modules 308, and may include program data 310.

The gateway server 112 may further include additional data storage devices (removable and/or non-removable) such as, for example, magnetic disks, optical disks, or tape. Such additional storage is illustrated in FIG. 3 by storage 312. Computer storage media may include volatile and nonvolatile, removable and non-removable media implemented in any method or technology for storage of information, such as computer readable instructions, data structures, program modules, or other data. The system memory 304 and storage 312 are all examples of computer-readable storage media. Computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the gateway server 112. Any such computer-readable storage media may be part of the gateway server 112.

In various embodiment, any or all of the system memory 304 and the storage 312 may store programming instructions which, when executed, implement some or all of the above-described operations of the access gateway device 110 or other components described in the environment 100 shown in FIG. 1.

The gateway server 112 may further have input device(s) 314, such as a keyboard, a mouse, a touch-sensitive display, voice input device. Output device(s) 316, such as a display, speakers, and a printer may further be included. The gateway server 112 may further contain communication connections 318 that allow the device to communicate with other computing devices 320.

In various implementations, the gateway server 112 may be configured to communicate and exchange data with the RANs 108 and/or the Internet 114 as part of the network 106. The gateway server 112 may manage bandwidth allocations, perform bandwidth and scheduling analyses, and/or provide data to the user device 102, including and in addition to the data exchanged between the user device 102 and the server 124.

Illustrative Processes

Figure 4:
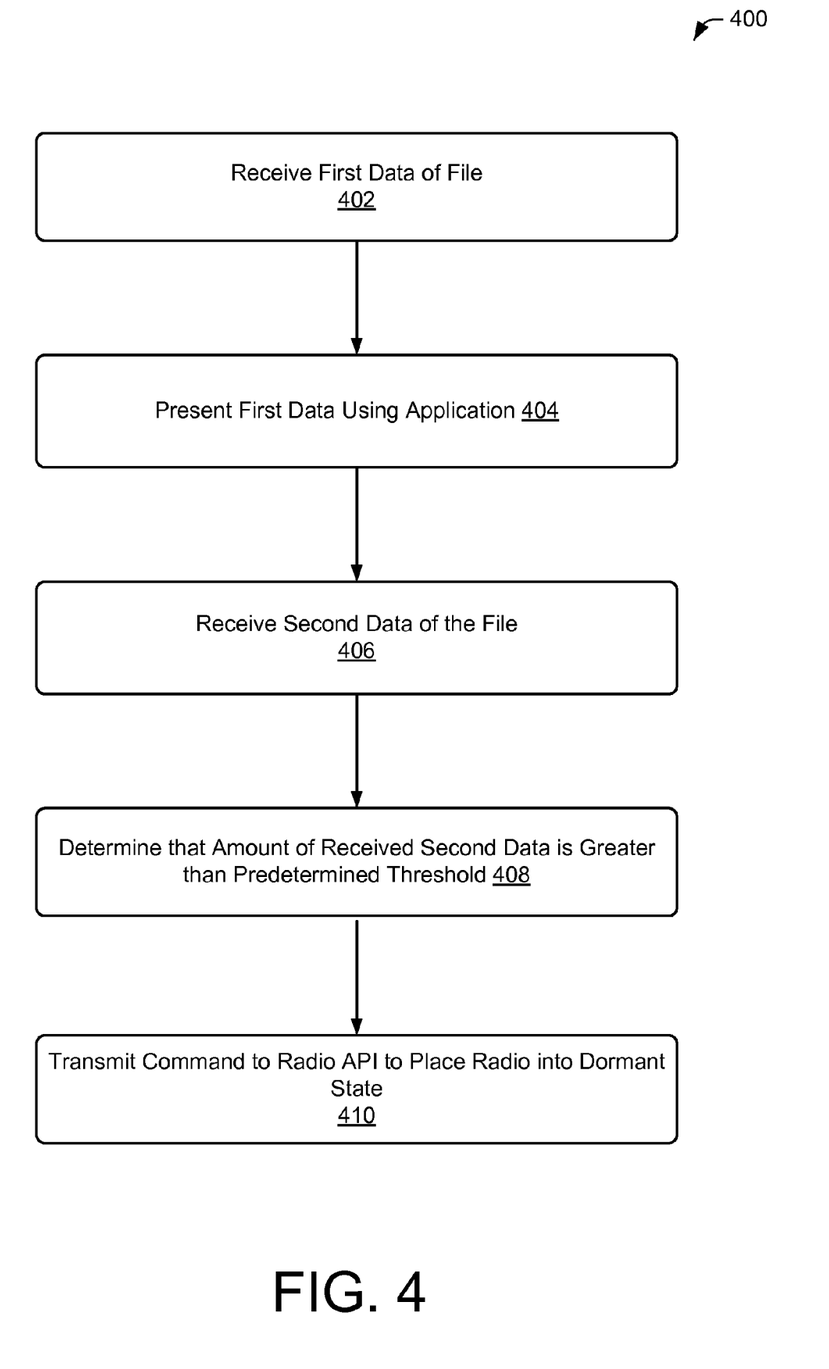
FIG. 4 is a flow diagram of an illustrative process for controlling a radio of a user device from an application on the user device.
Figure 5:
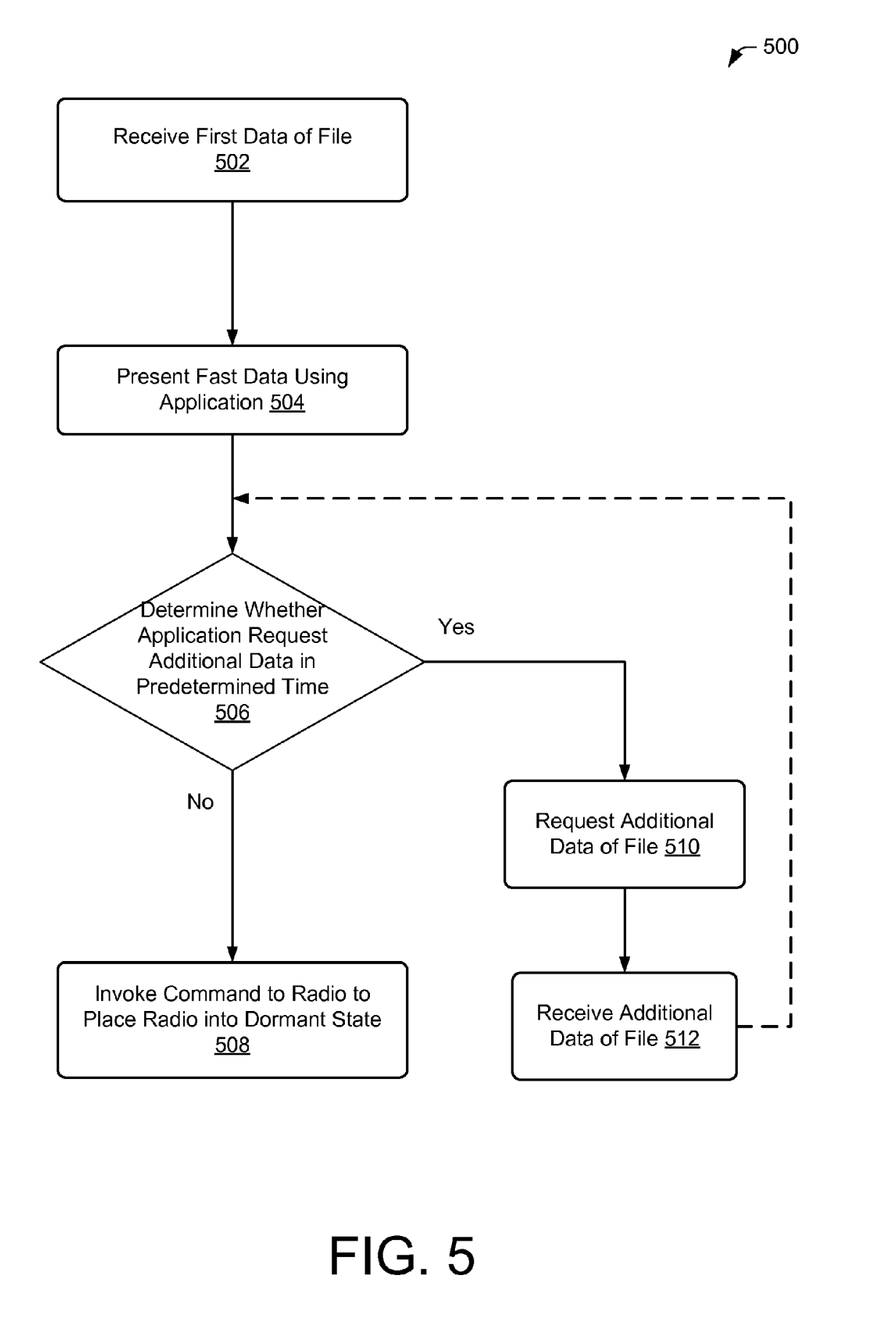
FIG. 5 is another flow diagram of an illustrative process for controlling a radio of a user device from an application on the user device.

FIG. 4 and FIG. 5 present illustrative processes 400 and 500 for providing an application with control of a radio of a mobile device. Each of the processes 400 and 500 is illustrated as a collection of blocks in a logical flow graph, which represent a sequence of operations that may be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the process.

FIG. 4 is a flow diagram of an illustrative process 400 for controlling a radio of a user device from an application on the user device. The process 400 is described with reference to the computing environment 100, as well as the computing architectures 200 and 300. However, the process 400 may be implemented in other environments, and/or computing architecture.

At 402, one or more processors of the user device 102 may receive first data of the media file 120. For example, the one or more processors may receive a first portion of the data streams 118 from the server 124 via the RANs 108.

At 404, the one or more processors may present the first data using the application 116 implemented by the user device 102. For example, the one or more processors may present the first portion of the data streams 118 in the user interface 122 of the application 116.

At 406, the one or more processors may receive second data of the media file 120. For example, the one or more processors may receive a second portion of the data streams 118 from the server 124 via the RANs 108.

At 408, the one or more processors may determine that an amount of data in the second data received by the application 116 is greater than a predetermined threshold.

At 410, in response to a determination that an amount of data in the second data received by the application 116 is greater than a predetermined threshold, the one or more processor may invoke a command associated with the radio 228 by calling the radio API 240 to place the radio 228 into a dormant state. In some implementations, the radio API 240 is configured to couple the application 116 to the radio 228.

In some implementations, the one or more processors may apply fast dormancy to the user device to transit from a connected state to a dormant state, for example, in response to a determination that the amount of data in the second data is greater than a predetermined threshold and/or that the application 116 stopped transmitting data to and receiving data from the network 106. In these instances, a power consumption of the user device 102 at the dormant state is less than a power consumption of the user device 102 at the connected state. For example, the connected state may include at least one of a Cell_DCH state, a Cell_ACH state, a Cell_PCH state, or a URA_PCH state. The dormant state may include at least one of a Cell_FACH state, a Cell_PCH state, a URA_PCH state, or a 4G LTE idle mode.

In some implementations, the one or more processors may enable an access of the radio API 240 in response to a user selection or a determination that a remaining battery level of the user device 102 is less than a predetermined threshold. In these instances, the radio API 240 may be implemented/exposed by the RIL 226.

In other implementations, the one or more processors may further monitor data transmission between an additional application and the network 106. In these instances, the one or more processors may invoke the command associated with the radio 228 by calling the radio API 240 to place the radio 228 into the dormant state in response to a determination that there is no data transmission between the additional application and the network 106.

FIG. 5 is another flow diagram of an illustrative process 500 for controlling a radio of a user device from an application on the user device. The process 500 is described with reference to the computing environment 100 and the computing architectures 200 as well as 300. However, the process 500 may be implemented in other environments, and/or computing architecture.

At 502, one or more processors of the user device 102 may receiving first data of the media file 120. For example, the application 116 may receive the first data from the server 124 via the network 106.

At 504, the one or more processors may present the first data using the application 116. For example, the one or more processors may present a first portion of the data streams 118 to the user 104 in the user interface 122.

At 506, the one or more processors may determine whether the application 116 continues to request additional data of the media file 120 in a predetermined time period. In some implementations, the one or more processors may receive second data of the media file 120, and determine that the application 116 stopped requesting the additional data of the file in the predetermined time period in response to a determination that an amount of the second data is greater than a predetermined threshold, and/or that a ratio of an amount of the first data and the second data to an amount of data in the media file 120 is greater than a predetermined value.

In response to a determination that the application stopped requesting the additional data of the media file 120 in the predetermined time period (i.e., the branch of "No" of the operation 506), the one or more processors may invoke a command associated with the radio 228 by calling the radio API 240 to place the radio 228 into a dormant state at 508. In some implementations, the radio API 240 is configured to couple the application to the radio.

In response to a determination that the application continues to request the additional data of the file in the predetermined time period (i.e., the branch of "Yes" of the operation 506), the one or more processors may request the additional data of the media file 120 at 510.

At 512, the one or more processors may receive the additional data of the media file 120. In some instances, the operation 506 may be performed by a loop process via a dashed line from the operation 512 to the operation 506.

In some implementations, the one or more processors may determine that the application 116 stopped requesting the additional data of the file in the predetermined time period in response to a determination that the presenting the file in the application 116 has not been intervened by the user 104 in an additional predetermined time period.

In some implementations, the one or more processors may trigger the user device 102 to enter a RRC state associated with fast dormancy in response to a predetermined condition, such as a determination that the application 116 stopped transmitting and receiving data from the network 106.

CONCLUSION

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

What is claimed is:

1. A method for operating a user device, the method comprising:
   receiving, by one or more processors, data of a file;
   presenting the data of the file using an application implemented by the user device; and
   in response to a determination that an amount of the data in the file is greater than a predetermined threshold, invoking, by the one or more processors, a command associated with a radio of the user device by calling a radio application programming interface (API) to place the radio into a dormant state, the radio API coupling the application to the radio.

2. The method of claim 1, wherein the radio comprises a modem or radio transceiver, or a combination thereof.

3. The method of claim 1, further comprising:
   applying fast dormancy to the user device to transit from a connected state to the dormant state.

4. The method of claim 3, wherein a power consumption of the user device at the dormant state is less than a power consumption of the user device at the connected state.

5. The method of claim 3, wherein the connected state comprises at least one of a Cell_DCH state, a Cell_FACH state, a Cell_PCH state, or a URA_PCH state.

6. The method of claim 3, wherein the dormant state comprises at least one of a Cell_FACH state, a Cell_PCH state, a URA_PCH state, or an idle mode.

7. The method of claim 1, further comprising:
   providing access to the radio API in response to a user selection or a determination that a remaining battery level of the user device is less than a predetermined threshold.

8. The method of claim 1, wherein the radio API is implemented by a radio interface layer (RIO of an operating system of the user device.

9. The method of claim 1, wherein the file is a media file that comprises at least one of a video file, an audio file, a text file, or a multimedia file.

10. The method of claim 1, further comprising:
monitoring data transmission between an additional application and a network, wherein the invoking the command associated with the radio of the user device by calling the radio API to place the radio into a dormant state comprises invoking the command associated with the radio of the user device by calling the radio API to place the radio into the dormant state in response to a determination that there is no data transmission between the additional application and the network.

11. One or more non-transitory computer-readable media storing computer-executable instructions that, when executed on one or more processors, causes the one or more processors to perform acts comprising:
receiving first data of a file, the first data requested by an application implemented by a user device;
presenting the first data in the application;
determining whether the application continues to request additional data of the file in a predetermined time period; and
in response to a determination that the application stops requesting the additional data of the file in the predetermined time period, invoking a command associated with a radio of the user device by calling a radio API to place the radio into a dormant state, the radio API coupling the application to the radio.

12. The one or more non-transitory computer-readable media of claim 11, wherein the acts further comprise:
receiving second data of the file;
determining that the application stops requesting the additional data of the file in the predetermined time period in response to a determination that:
an amount of the second data is greater than a predetermined threshold, or
a ratio of an amount of the first data and the second data to an amount of data in the file is greater than a predetermined value.

13. The one or more non-transitory computer-readable media of claim 11, wherein the acts further comprise:
determining that the application stops requesting the additional data of the file in the predetermined time period in response to a determination that the presenting the file in the application has not been intervened in an additional predetermined time period.

14. The one or more non-transitory computer-readable media of claim 11, further comprising:
triggering the user device to enter a radio resource control (RRC) state associated with fast dormancy in response to a predetermined condition.

15. The one or more non-transitory computer-readable media of claim 11, wherein the acts further comprise:
providing a software development kit (SDK) associated with the radio API, the SDK providing a plurality of application programming interfaces (APIs) or developer tools.

16. A user device comprising:
a radio;
one or more processors; and
memory to maintain a plurality of components executable by the one or more processors, the plurality of components comprising:
an application configured to:
receive first data of a file,
present the first data of the file in a user interface associated with the application,
receive second data of the file, and
invoking a command associated with the radio by calling a radio API to place the radio into a dormant state in response to a determination that an amount of the second data is greater than a predetermined threshold, and
the radio API configured to couple the application and the radio.

17. The user device of claim 16, wherein the plurality of components further comprise:
a dormancy module configured to apply fast dormancy to the user device to transit from a connected state to a dormant state.

18. The user device of claim 17, wherein a power consumption of the user device at the dormant state is less than a power consumption of the user device at the connected state.

19. The user device of claim 17, wherein the connected state comprises at least one of a Cell_DCH state, a Cell_FACH state, a Cell_PCH state, or a URA_PCH state.

20. The user device of claim 17, wherein the dormant state comprises at least one of a Cell_FACH state, a Cell_PCH state, a URA_PCH state, or an idle mode.

* * * * *